No. 619,597. Patented Feb. 14, 1899.
E. L. MORGAN.
PLANTING ATTACHMENT FOR PLOWS.
(Application filed Sept. 15, 1898.)
(No Model.) 2 Sheets—Sheet 1.
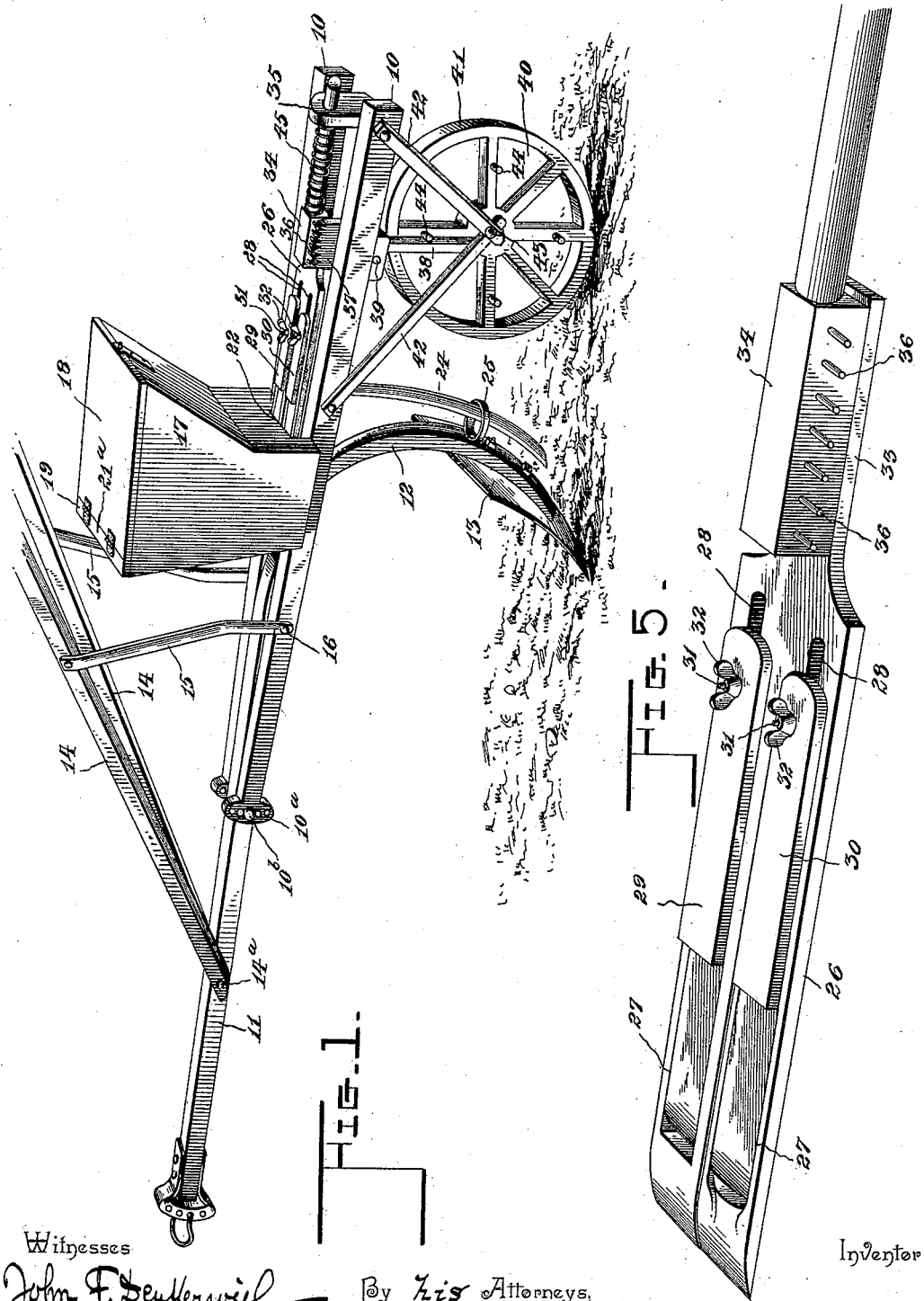

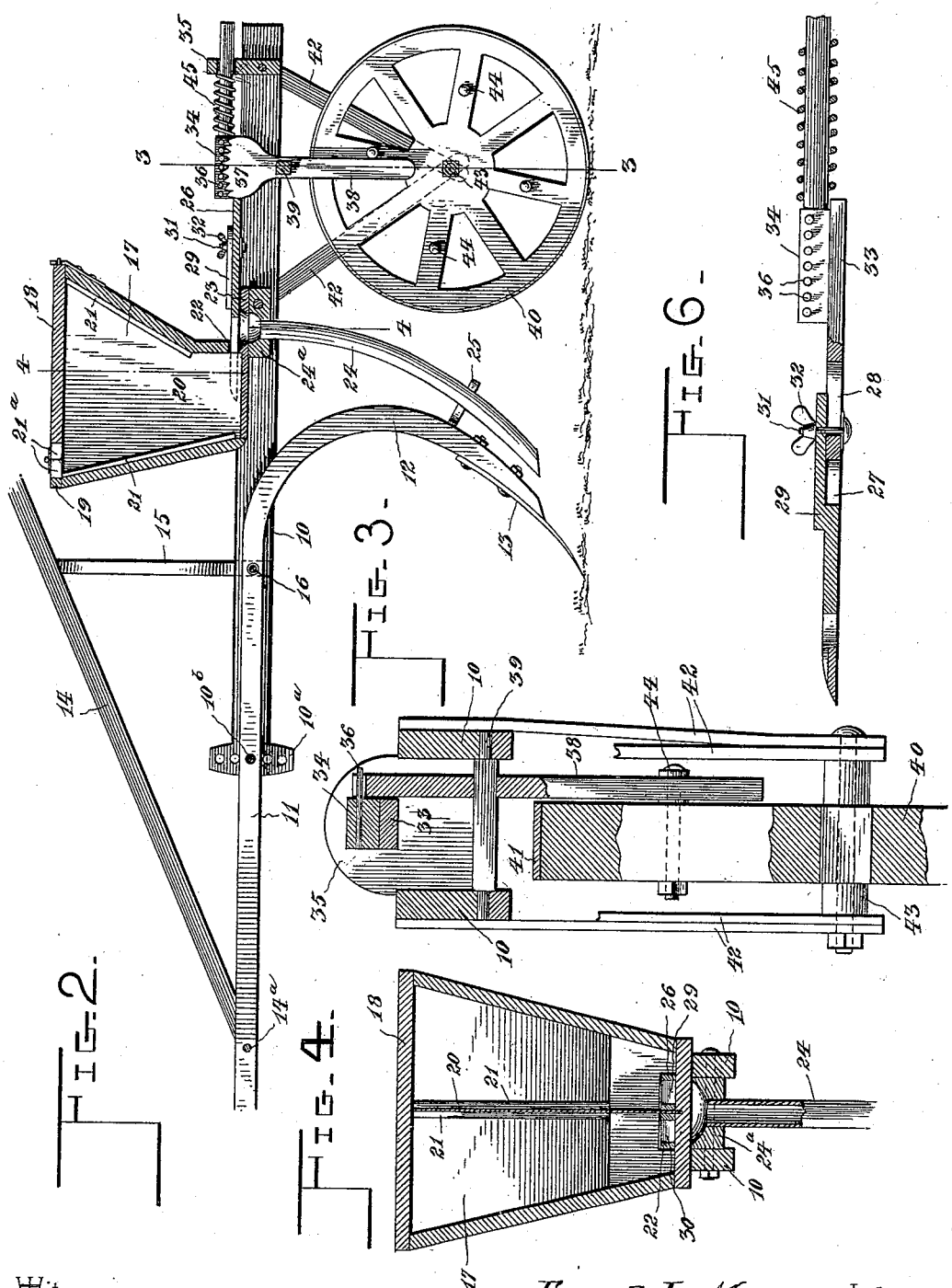

UNITED STATES PATENT OFFICE.

ERNEST L. MORGAN, OF DAVIS' MILLS, VIRGINIA.

PLANTING ATTACHMENT FOR PLOWS.

SPECIFICATION forming part of Letters Patent No. 619,597, dated February 14, 1899.

Application filed September 15, 1898. Serial No. 691,038. (No model.)

*To all whom it may concern:*

Be it known that I, ERNEST L. MORGAN, a citizen of the United States, residing at Davis' Mills, in the county of Bedford and State of Virginia, have invented a new and useful Planting Attachment for Plows, of which the following is a specification.

My invention is a planter attachment for plows; and the object in view is to provide a simple and inexpensive contrivance which is constructed for secure application to a metallic beam of any ordinary plow or cultivator.

Further objects of the invention are to provide means by which fertilizer may be dropped in the hill with the seed, to regulate the quantity of seed and fertilizer which may be dropped by each movement of the dropping-slide, to regulate the intervals of dropping and the distance the seed and fertilizer may be deposited in the ground, and to steady the seed tube or conduit, which is disposed in rear of the furrow-opener.

With these ends in view the invention consists in the novel combination of elements and in the construction and arrangement of parts, which will be hereinafter fully described and claimed.

To enable others to understand the invention, I have illustrated it in the accompanying drawings, forming a part of this specification, and in which—

Figure 1 is a perspective view of an ordinary plow equipped with a planting mechanism constructed in accordance with my invention. Fig. 2 is a vertical longitudinal sectional elevation of the plow and planter mechanism. Fig. 3 is a vertical transverse section through the mechanism for operating the dropper-slide, the plane of section being indicated by the dotted line 3 3 of Fig. 2. Fig. 4 is another transverse sectional elevation on a plane through the hopper and indicated by the dotted line 4 4 of Fig. 2. Fig. 5 is a detail perspective view of the dropper-slide, and Fig. 6 is a longitudinal section through the slide shown by Fig. 5.

Like numerals of reference denote like and corresponding parts in each of the several figures of the drawings.

In the embodiment of the invention represented by the drawings the frame 10 of the implement is shown as consisting of two members united or coupled together by suitable bolts and provided at the front end thereof with an enlarged perforated head $10^a$. To adapt the planter mechanism of my invention for service in connection with a metallic plow-beam 11, the members of the frame are spaced or spread to receive between themselves the beam 11, and this frame is attached pivotally to the beam and has its head $10^a$ secured adjustably to said beam. The beam is curved to form a stock 12, which is equipped with a furrow-opener shovel 13 of any approved construction. The handles 14 are fastened by the bolt $14^a$ to the beam of the implement, and they are stayed by the braces 15, which have their lower ends secured to the frame and the beam by the bolt 16, that serves to fasten the plow-beam 11 to the frame 10 at the point where the beam and frame are attached pivotally together. The perforated head $10^a$ of the planter-frame is secured adjustably to the beam by the bolt $10^b$ to regulate the penetration of the furrow-opener.

The hopper 17 of the planter attachment has its bottom secured to the frame 10, and the open upper end of the hopper is designed to be closed by a top or cover 18, which is hinged to a fixed rail 19. The interior of the hopper is or may be divided into two compartments by a vertical partition 20, which is secured in place removably between pairs of cleats 21, that are attached to the sloping front and rear walls of said hopper, and the rail 19 and the hinged edge of the cover 18 have the slots or kerfs $21^a$, which are coincident with the space between the pair of cleats on the front wall of the hopper, whereby the partition 20 may be withdrawn from the hopper and through the kerfs or slots in the rail and cover when the latter is moved to an open position.

The rear wall of the hopper is provided immediately above the bottom thereof with a transverse opening 22, through which is adapted to play the dropper-slide, presently described, and the hopper-bottom is extended rearwardly, as at 23, to furnish a support for said dropper-slide. Immediately below the extended rear end 23 of the hopper-bottom is secured a block $24^a$, that supports the depending delivery-tube 24, which is fixed to said block 24ᵃ to have its upper open end receive the seed or the seed and fertilizer, which is contained within the dropper-slide, and the lower end of this delivery-tube is confined in proper position in rear of the furrow-opener by means of a keeper or ring 25, which is fitted loosely around the plow-stock 12 and the delivery-tube near the lower end of the latter.

The dropper-slide 26 rests upon the hopper-bottom and its extension 23, and it is fitted loosely in the opening 22 of said hopper. The end of the slide which plays in the lower part of the hopper is provided with the wide longitudinal slots 27 and the other end of said slide, which protrudes in rear of the hopper, has the narrow slots 28, adapted for the reception of the bolts which fasten the regulating-plates 29 upon the dropper-slide. The slide is fitted within the hopper to occupy a position therein for the vertical partition 20 to lie between the pair of wide slots 27 in said dropper-slide, and the fertilizer which is contained in one compartment of the hopper and the corn or other seed in the other compartment of said hopper are thus adapted to be delivered separately to the slots of a common dropper-slide. The area of the slots exposed for the reception of the seed and fertilizer may be varied by proper adjustment of the regulating-plates 29 30, and thus the number of grains of corn or seed and the quantity of fertilizer which may be discharged from the hopper at each movement of the dropper-slide may be regulated. The plates 29 30 are fitted to the slide over or within the wide slots 27 of said slide, and these plates are fastened securely to the slide by means of the bolts 31, which pass through the narrow slots 28 and receive the winged nuts 32, that serve to hold said plates in their adjusted positions on the slide. It is evident that these regulating-plates may be adjusted separately or independently to vary the number of seed and the quantity of fertilizer, and this independent adjustment of the two plates is permissible, because they are separate one from the other and are clamped individually to the slide. It is also evident that the partition 20 may be removed from the hopper to allow the latter to be used for planting the seed or grain without distributing the fertilizer, and in this adaptation of the machine one or both of the slots in the dropper-slide may be employed by proper adjustment of the regulating-plates.

The protruding end of the dropper-slide is reduced to form a shank 33, to which is securely fastened the head of a guide-stem 34, which is slidably fitted in a guide-block 35, the latter being fixed to and between the members of the beam 10. This guide-stem is adapted to reciprocate with the dropper-slide, and its enlarged head is provided with a rack 36. This rack is represented in the drawings as consisting of a number of pins or studs which project from one side of the enlarged stem-head; but the detailed construction of the rack is not material, because a series of gear-teeth may be formed on the face of the rack for engagement with the operating-segment.

The segment 37 occupies a vertical position between the members of the frame 10 and alongside of the stem of the dropper-slide, and the segment is provided with a depending arm 38. The segment is supported in operative relation to the stem of the dropper-slide by a pivotal shaft or rod 39, suitably mounted in the members of the frame 10, so that the toothed segmental edge of said segment may mesh with the rack 36 for reciprocating the slide at the proper intervals. The arm of this segment is adjacent to the face of a wheel 40, that is disposed below the frame 10, and this wheel is equipped with a broad tread or periphery 41 for the purpose of covering the seed and fertilizer deposited in the furrow by the action of the planter mechanism. Hangers 42 are secured to the members of the frame 10 for supporting the axle 43 of the ground and coverer wheel 40, and this wheel is equipped with one or a series of operating-pins 44, which are adapted to ride against the arm of the segment 37 to actuate the latter. The segment is thus adapted for operation by the pins on the coverer-wheel to move the dropper-slide positively in one direction at suitable intervals, and the return movement of this slide is effected by means of a coiled spring 45, which is fitted loosely on the stem 34 of the dropper-slide to have one end thereof seated against the enlarged head of said stem, while the other end of the spring bears against the fixed guide-block 35.

One or a series of the operating-pins 44 may be attached to the disk for the purpose of operating the dropper-slide one or a number of times on each revolution of the covering-wheel, according to the distance of the planting or dropping of the seed with or without the fertilizer. The pin or pins are secured removably to the face of the covering-wheel, so that the number of pins which may be in service can be varied, and these pins are attached to the face of the wheel in positions for the arm of the segment to lie in the path of said pins. If it is desired to drop the seed and fertilizer at intervals of about thirty-six inches apart, a single pin 44 is attached to the wheel to operate the dropper-slide once on each revolution of the wheel. If the seed is to be planted at intervals of eighteen inches, two of the pins are employed on diametrically opposite sides of the wheel to strike the segment-arm twice on each revolution of said wheel, and to plant the seed at intervals of nine inches a series of four pins are arranged equidistant on the wheel to operate the segment and the slide four times on each rotation of the wheel.

The draft may be changed by proper adjustment of the frame 10 to vary the penetration of the furrow-opener and regulate the depth of planting of the seed. The planter mechanism may be used to drop any kind of seed—such as corn, beans, peas, and the like—and by proper adjustment of the partition in the hopper seed may be placed in one compartment thereof and fertilizer deposited in the other compartment of said hopper.

The operation may be described as follows: The seed to be planted with or without the fertilizer are deposited in the hopper and the desired number of pins 44 are attached to the ground-wheel, the plate or plates having been previously adjusted on the dropper-slide to determine the number of seed and the quantity of fertilizer to be dropped on each reciprocating movement of the slide. The ground-wheel is rotated by traction as the machine is drawn by the animal and the segment 37 is vibrated or rocked by the impingement of the pin or pins against its depending arm. The segment is operated positively to move the slide in one direction; but the return movement of the slide is effected by the recoil of the spring 45. As the slide is moved in a rearward direction the seed, with or without the fertilizer, is conveyed from the hopper and deposited in the delivery-tube 24, and the slide is then returned to a position within the hopper for its slot or slots to be filled with the seed and fertilizer.

My planter mechanism may be secured to any ordinary plow-beam and its parts are efficient and reliable in operation.

Changes may be made in the form of some of the parts, while their essential features are retained and the spirit of the invention embodied. Hence I do not desire to be limited to the precise form of all the parts, as shown, reserving the right to vary therefrom.

Having thus described the invention, what I claim is—

1. The combination with a hopper, a slide, and a ground-wheel, of a rocking segment fulcrumed at a point intermediate of its length, geared at one end to said slide, and engaging at its other end with the ground-wheel, substantially as described, for the purpose set forth.

2. In a planter, a frame, a divided hopper, a single dropper-slide provided with the parallel slots, the independent regulating-plates both fitted to the slide, and the independent clamping-bolts connected to the slide and the plates, combined with a ground-wheel journaled on the frame, and a rocking segment pivoted at a point intermediate of its length on the frame, operatively connected with the dropper-slide, and provided with an arm which is disposed in the path of the pins of the ground-wheel, substantially as described.

3. The combination with a plow-beam having a stock, of a planter attachment comprising a frame connected to the beam and extending rearwardly therefrom, a hopper mounted on the planter-frame independently of the beam, a fixed block secured to the frame in rear of the hopper, a delivery-tube attached to said block and having its lower end confined on the plow-stock by a keeper or ring, a dropper-slide, a ground-wheel journaled in the frame, and an intermediate connection between the ground-wheel and dropper-slide and mounted in the frame, substantially as described.

4. The combination with a plow-beam, of a two-part planter-frame arranged to have its members embrace, and pivotally connected to, said beam and said frame having a head which is fastened adjustably to the beam, a hopper supported on the planter-frame, a ground-wheel mounted on the planter-frame, and a dropping mechanism in active relation to the hopper and connected operatively with the ground-wheel; the entire planter mechanism being attachable or detachable at will from the plow-beam, substantially as described.

5. The combination with a plow-beam, of a planter-frame pivoted to the beam and having a perforated head which is attached adjustably to the frame, a hopper mounted on said frame independently of the plow-beam, a dropper mechanism, and a ground-wheel journaled on the frame and having operative connections with the dropper mechanism, the entire planter attachment being removable and attachable at will to and from the plow-beam through the medium of the frame, substantially as described.

6. In a planter, the combination with a hopper, of a dropper-slide provided with a rack, means for retracting the slide in one direction, a rocking segment pivoted at a point intermediate of its length and meshing with the rack to move the slide in the opposite direction to the retracting device, and a ground-wheel having an operative engagement with the segment to oscillate the same on its axis, substantially as described.

In testimony that I claim the foregoing as my own I have hereto affixed my signature in the presence of two witnesses.

ERNEST L. MORGAN.

Witnesses:
JOHN T. MORGAN,
E. M. QUISENBERRY.